US012196393B1

(12) United States Patent
Xu et al.

(10) Patent No.: US 12,196,393 B1
(45) Date of Patent: Jan. 14, 2025

(54) LED LAMP

(71) Applicant: SHENZHEN SNC OPTO ELECTRONIC CO., LTD., Guangdong (CN)

(72) Inventors: Jianyong Xu, Guangdong (CN); Zhiping Ma, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/630,977

(22) Filed: Apr. 9, 2024

(30) Foreign Application Priority Data

Dec. 13, 2023 (CN) ......................... 202323400857.6

(51) Int. Cl.

| | |
|---|---|
| ***F21V 17/06*** | (2006.01) |
| ***F21V 5/00*** | (2018.01) |
| ***F21V 14/02*** | (2006.01) |
| ***F21V 14/06*** | (2006.01) |
| ***F21V 21/088*** | (2006.01) |
| ***F21V 23/00*** | (2015.01) |
| ***F21V 31/00*** | (2006.01) |
| *F21Y 105/16* | (2016.01) |
| *F21Y 115/10* | (2016.01) |

(52) U.S. Cl.
CPC .............. *F21V 17/06* (2013.01); *F21V 5/007* (2013.01); *F21V 14/02* (2013.01); *F21V 14/06* (2013.01); *F21V 21/088* (2013.01); *F21V 23/009* (2013.01); *F21V 31/005* (2013.01); *F21Y 2105/16* (2016.08); *F21Y 2115/10* (2016.08)

(58) Field of Classification Search
CPC ...... F21V 23/009; F21V 21/008; F21V 14/02; F21V 14/06; F21V 5/007; F21V 17/06
See application file for complete search history.

(56) References Cited

U.S. PATENT DOCUMENTS

2021/0215323 A1* 7/2021 Flynn .................... F21V 15/015

FOREIGN PATENT DOCUMENTS

| | | | | | |
|---|---|---|---|---|---|
| CN | 114935133 | A * | 8/2022 | | |
| DE | 102020101152 | A1 * | 7/2021 | .............. | F21S 8/043 |
| WO | WO-2021212541 | A1 * | 10/2021 | ............. | B08B 1/002 |

OTHER PUBLICATIONS iInnovation Q+ NPL Search (Year: 2024).*

* cited by examiner

*Primary Examiner* — Anabel Ton

(57) ABSTRACT

An LED lamp includes a lamp body, a front surface of the lamp body being provided with a mounting groove; an LED lamp panel mounted in the mounting groove; a lens panel covering the LED lamp panel; a quick disassembling structure configured to detachably connect the lens panel to the lamp body.

10 Claims, 9 Drawing Sheets

LED LAMP

CROSS-REFERENCE TO RELATED APPLICATIONS

This application claims priority of Chinese Utility Model Application No. 2023234008576, filed on Dec. 13, 2023, entitled "LED LAMP", the entire content of which is incorporated herein in its entirety.

TECHNICAL FIELD

The present disclosure relates to lighting technology, and in particular to an LED lamp.

BACKGROUND

With the gradual development of LED lamps, the LED lamps are more and more popular. Since the LED lamps have advantages of high luminous purity, concentrated light beam, low power consumption and long service life, the LED lamp gradually replace some conventional light source products in public places such as lighting engineering auxiliary lighting, and has characteristics of high controllability. Generally, a lens and an LED lamp panel of the LED lamp can enhance the use efficiency and luminous efficiency of light, and different lenses can be used to change an optical system of a light field distribution of the LED lamp according to different effects. In this way, it is necessary to consider the convenience of replacing the lens of the led lamp.

Accordingly, it is necessary to improve a structure of the LED lamp.

SUMMARY

Accordingly, it is necessary to provide an LED lamp for disassembling and assembling a lens quickly.

An LED lamp includes a lamp body, a front side of the lamp body being provided with a mounting groove; an LED lamp panel mounted in the mounting groove; a lens panel covering the LED lamp panel; a quick disassembling structure fixed to the lamp body and configured to detachably connect the lens panel to the lamp body.

In one of the embodiments, the quick disassembling structure is an elastic sheet, the lens panel is provided with a through hole corresponding to the elastic sheet, an end of the elastic sheet is fixed to the lamp body, another end of the elastic sheet extends outward transversely and away from the LED lamp panel through the through hole, an upper surface of the elastic sheet facing the lens panel partially abuts against the lens panel, and an outer surface of the end of the elastic sheet extending outward away from the LED lamp panel is coplanar with the lens panel or located on a side of the lens panel away from the LED lamp panel.

In one of the embodiments, an edge of the lens panel is provided with an upward protruding step, and the step is operated to remove the lens panel after the elastic sheet is pressed, which is more convenient and quicker.

In one of the embodiments, the LED lamp further includes a rotating assembly and a moving member both mounted to the lamp body. The rotating assembly is movably connected to the moving member. The lens panel is provided with a connecting portion movably connected to the moving member. The moving member is driven to move by rotating the rotating assembly, and the moving member drives the lens panel to move through the connecting portion, so that a distance between the lens panel and the LED lamp panel is changed, thereby adjusting the light distribution direction.

In one of the embodiments, the rotating assembly includes a rotating shaft and a gear sleeved on the rotating shaft. the moving member is provided with a plurality of tooth holes cooperating with teeth of the gear, and the rotating assembly drives the moving member to move through the cooperation of the tooth and the tooth holes.

In one of the embodiments, the moving member is provided with an inclined or arc-shaped elongated hole. The connecting portion is located at the edge of the lens panel, and extends into the inclined or arc-shaped elongated hole. The connecting portion can be a connecting post. When the moving member is moved, an edge of the inclined or arc-shaped elongated hole will press the connecting portion, so that a position of the connecting portion is changed, and a relative position of the lens panel and the LED lamp panel is changed.

In one of the embodiments, the LED lamp further includes a pressing frame, a glass plate, and a first sealing ring provided between the glass plate and the pressing frame and received in the mounting groove, so that the LED lamp panel can achieve a good waterproof effect.

In one of the embodiments, the glass plate is located on a side of the lens panel away from the LED lamp panel and covers the mounting groove. An end of the pressing frame is buckled with the lamp body, and another end of the pressing frame is fixed to the lamp body.

In one of the embodiments, the LED lamp further includes a power supply assembly mounted on a rear side of the lamp body. The power supply assembly includes a power supply box, a driving power source and a controller mounted in the power supply box. The power supply assembly further includes a mounting bracket connected to the power supply box or the lamp body. In this way, the heat generated by the driving power source can be separated from the heat generated by the LED lamp panel without affecting each other, so as to improve a service life of the driving power source and the LED lamp panel.

In one of the embodiments, the LED lamp further includes a second sealing ring provided between the power supply box and the lamp body and connected to the power supply box, so that the power supply box can achieve a good waterproof effect.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
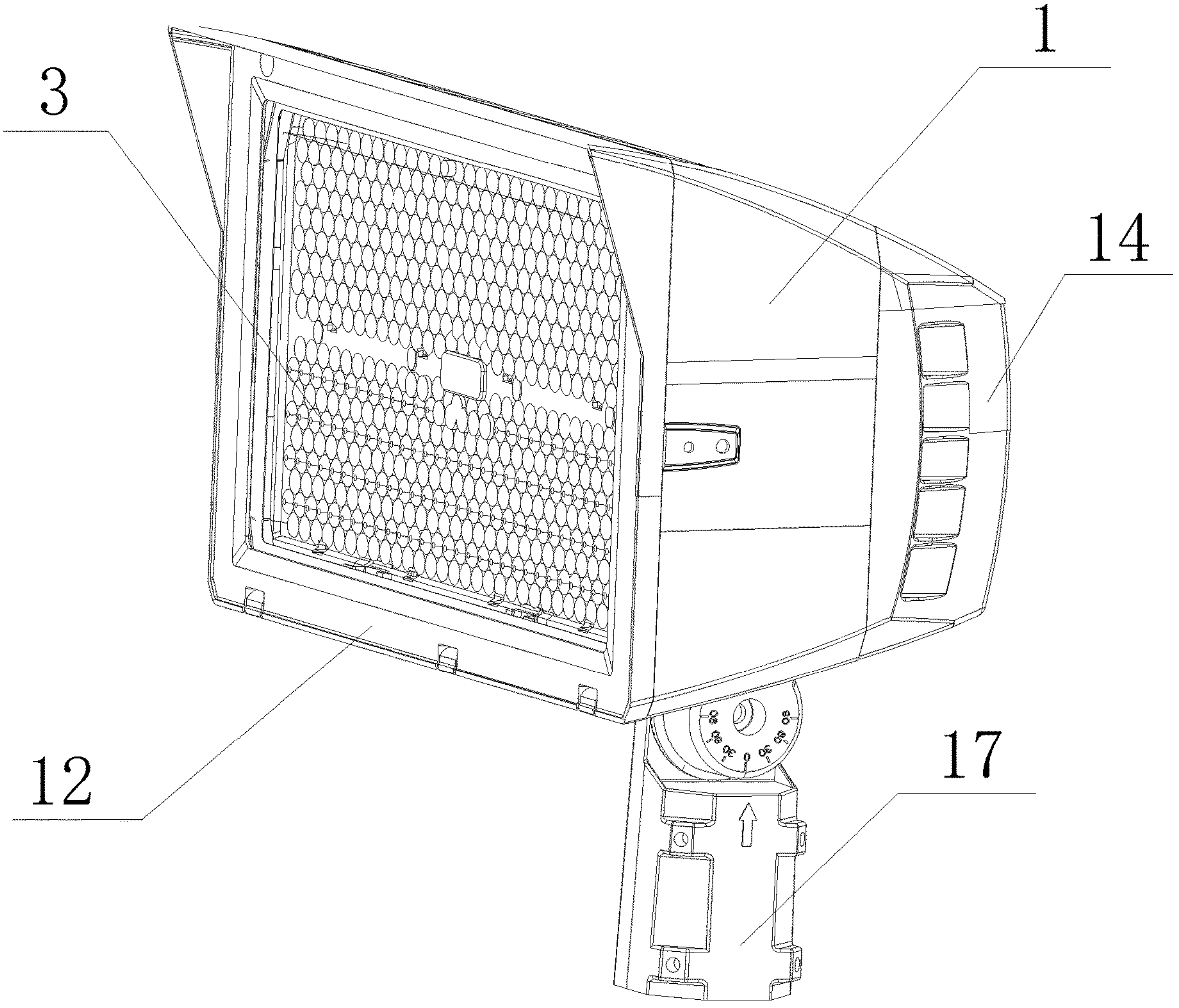
FIG. 1 is a perspective view of an LED lamp according to an embodiment of the present disclosure.

1. Lamp body; 2. LED lamp panel; 3. Lens panel; 4. Mounting groove; 5. Elastic sheet; 6. Step; 7. Rotating assembly; 8. Moving member; 9. Connecting portion; 10. Rotating shaft; 11. Gear; 12. Pressing frame; 13. Glass plate; 14. Power supply box; 15. Driving power source; 16. Controller; 17. Mounting bracket; 18. Through hole; 19. Outer surface.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
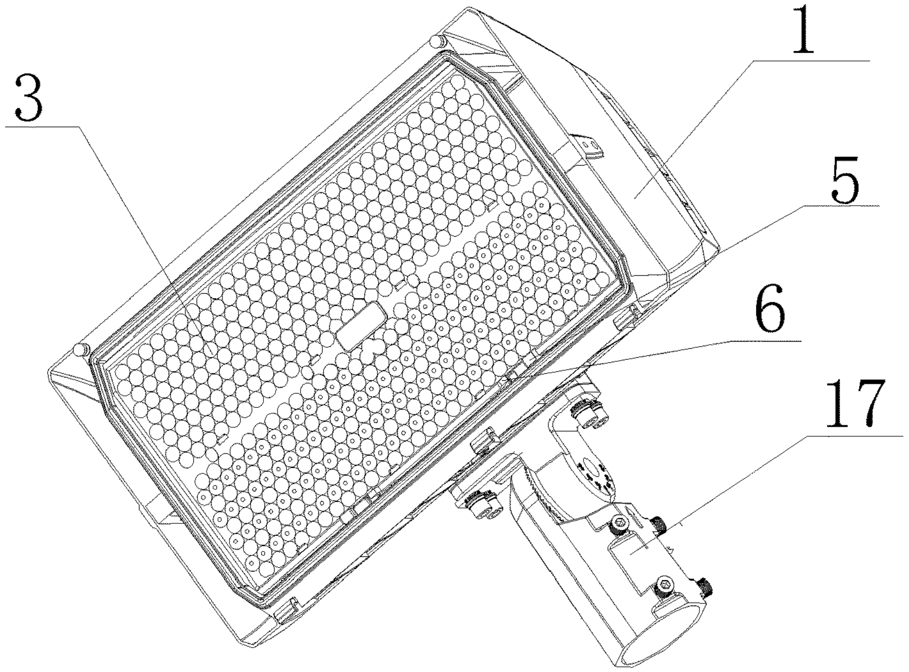
FIG. 2 is a perspective view of an LED lamp after removing a pressing frame and a glass plate according to an embodiment of the present disclosure.
Figure 3:
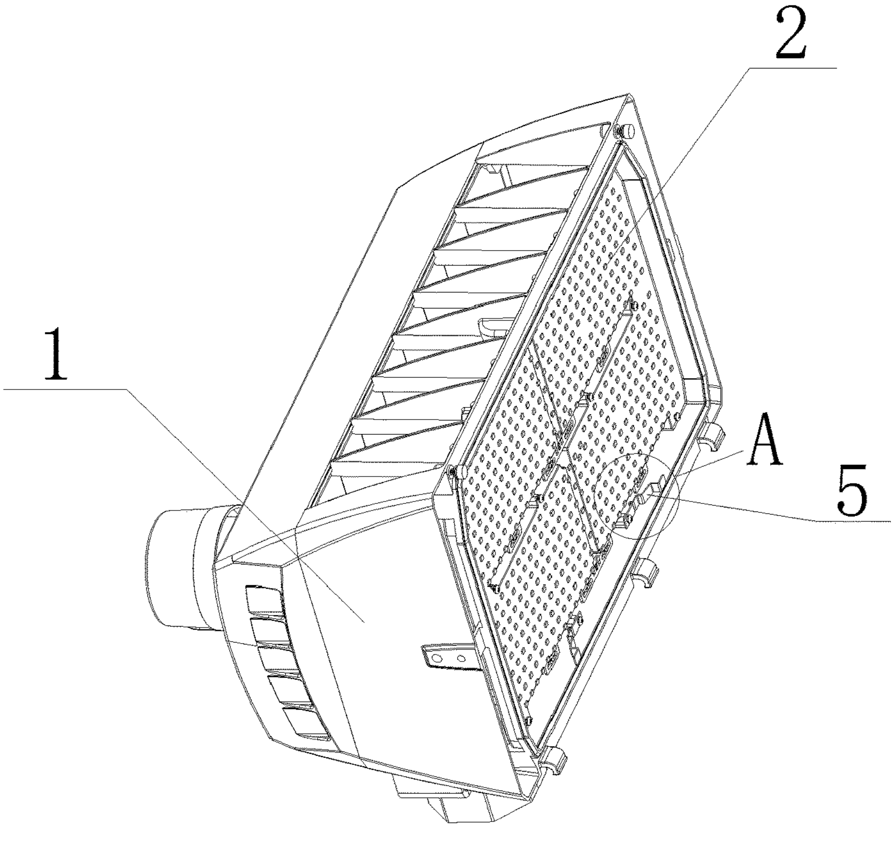
FIG. 3 is a perspective view of an LED lamp after removing the pressing frame, the glass plate and a lens panel according to an embodiment of the present disclosure.
Figure 4:
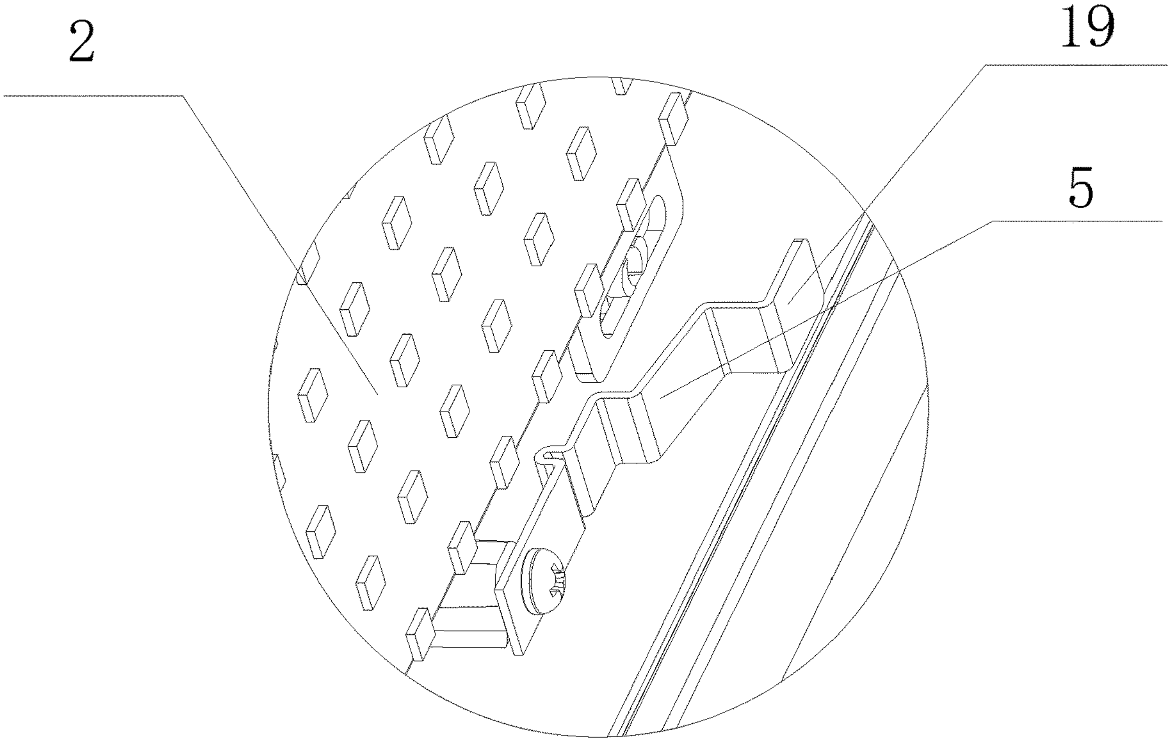
FIG. 4 is an enlarged view of position A of FIG. 3.
Figure 5:
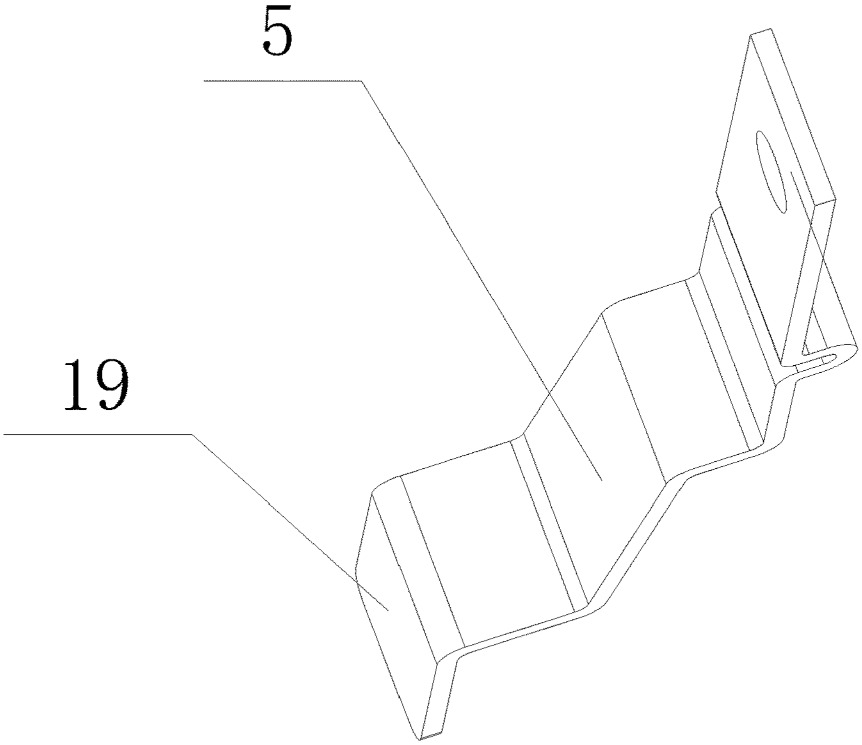
FIG. 5 is a perspective view of an elastic sheet member of FIG. 4.
Figure 6:
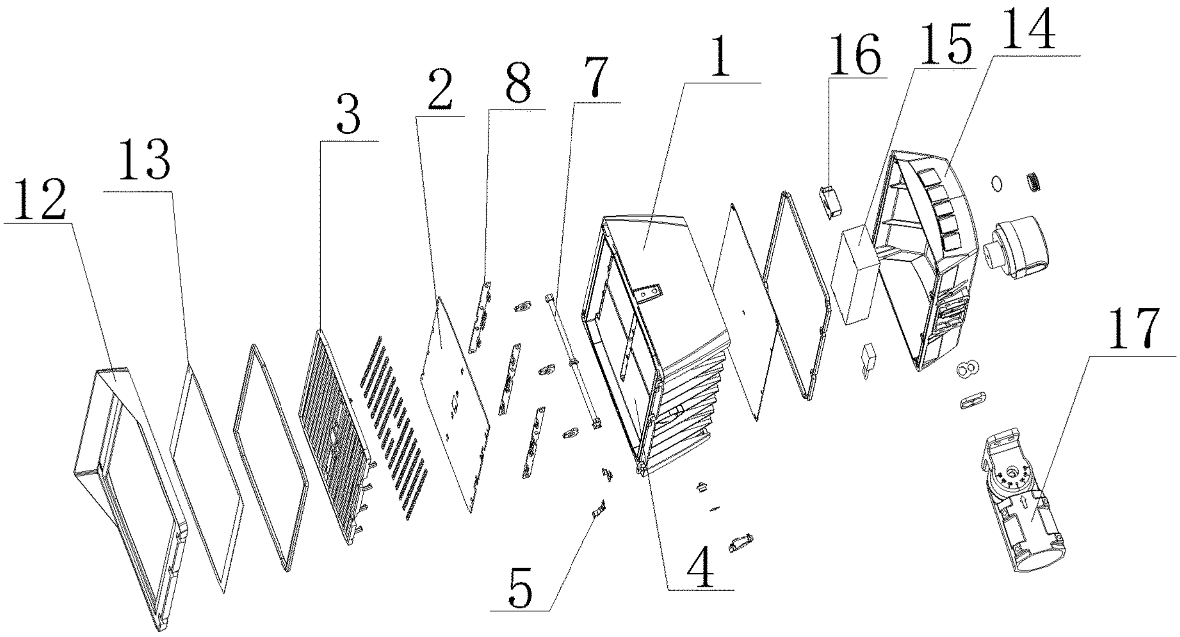
FIG. 6 is an exploded view of an LED lamp according to an embodiment of the present disclosure.
Figure 7:
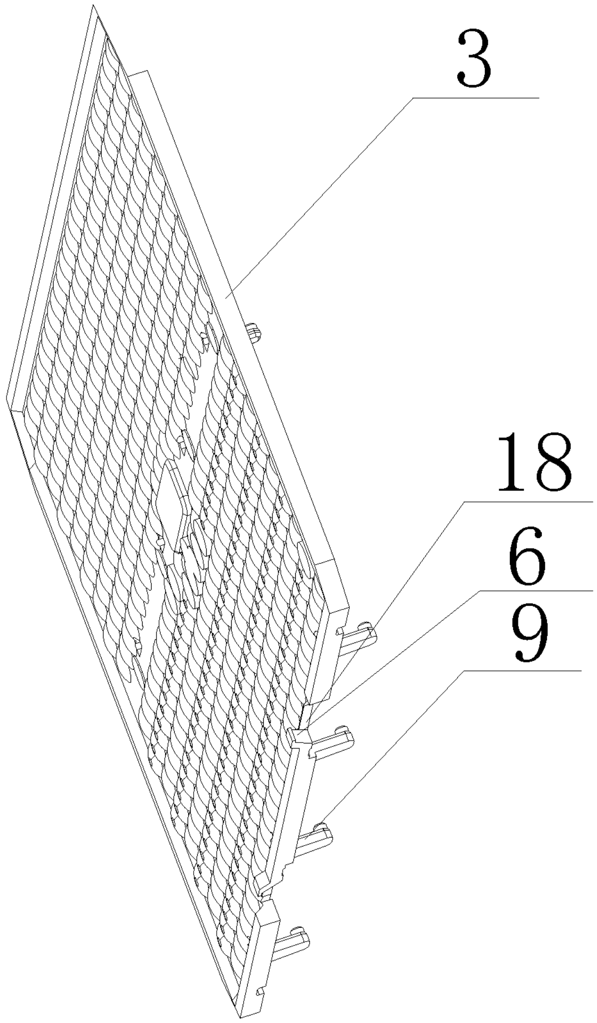
FIG. 7 is a perspective view of the lens panel of FIG. 6.
Figure 8:
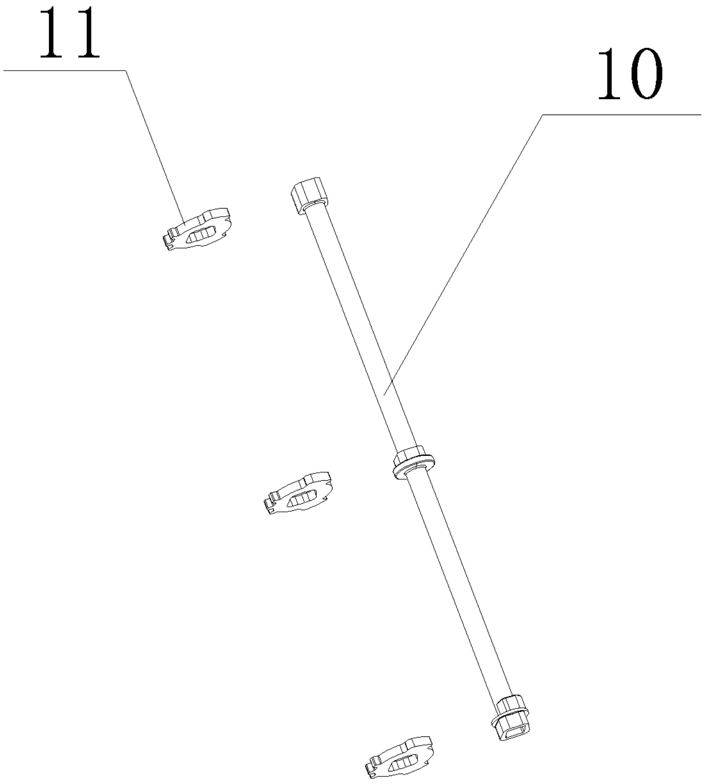
FIG. 8 is a schematic view of a rotating assembly of FIG. 6.
Figure 9:
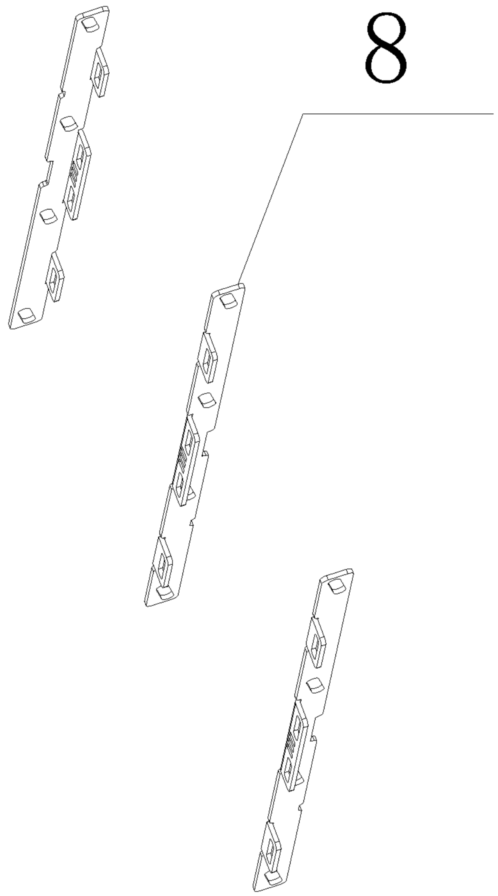
FIG. 9 is a perspective view of a moving member of FIG. 6.
Figure 10:
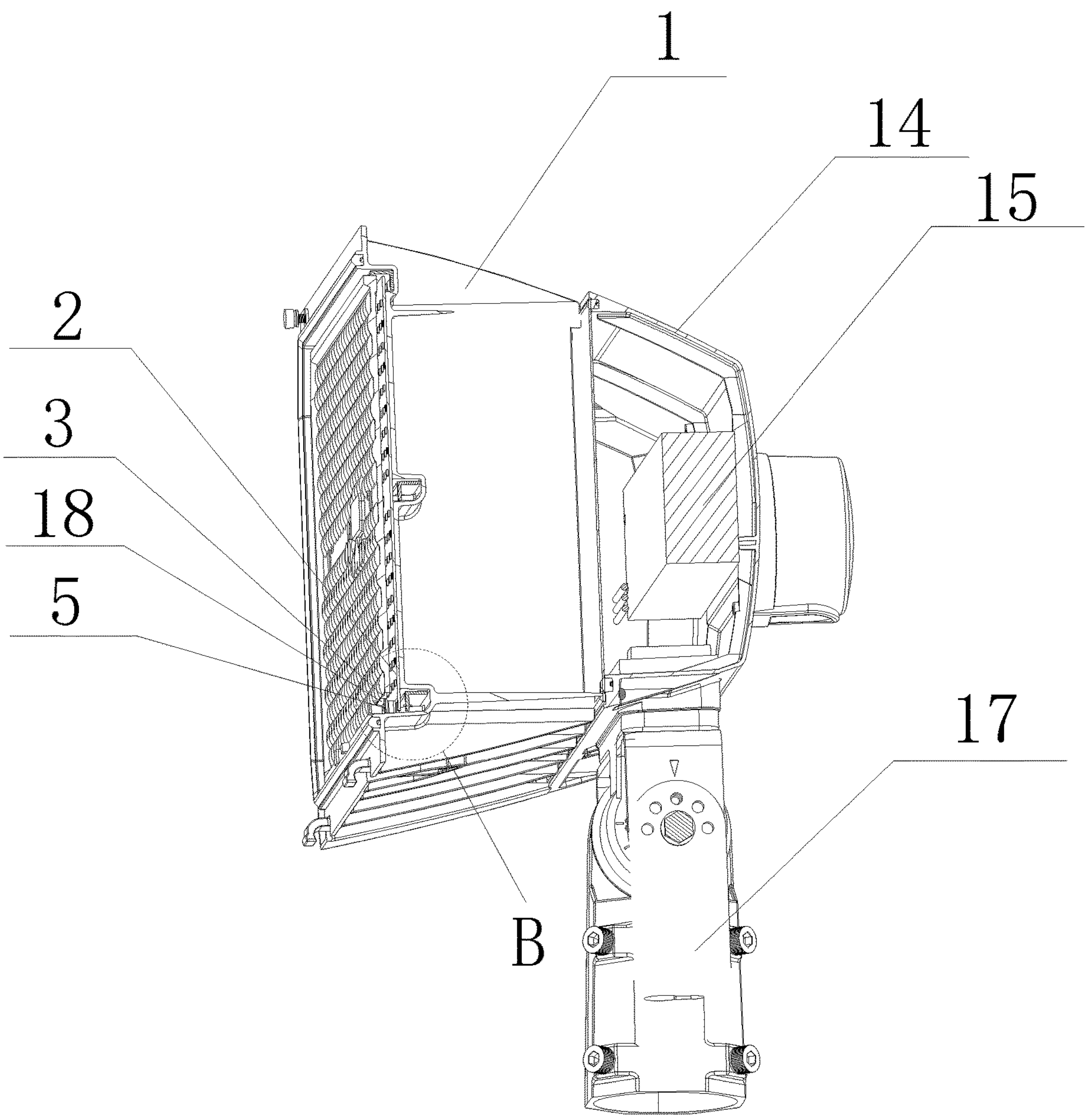
FIG. 10 is a perspective sectional view of the LED lamp shown in FIG. 1.
Figure 11:
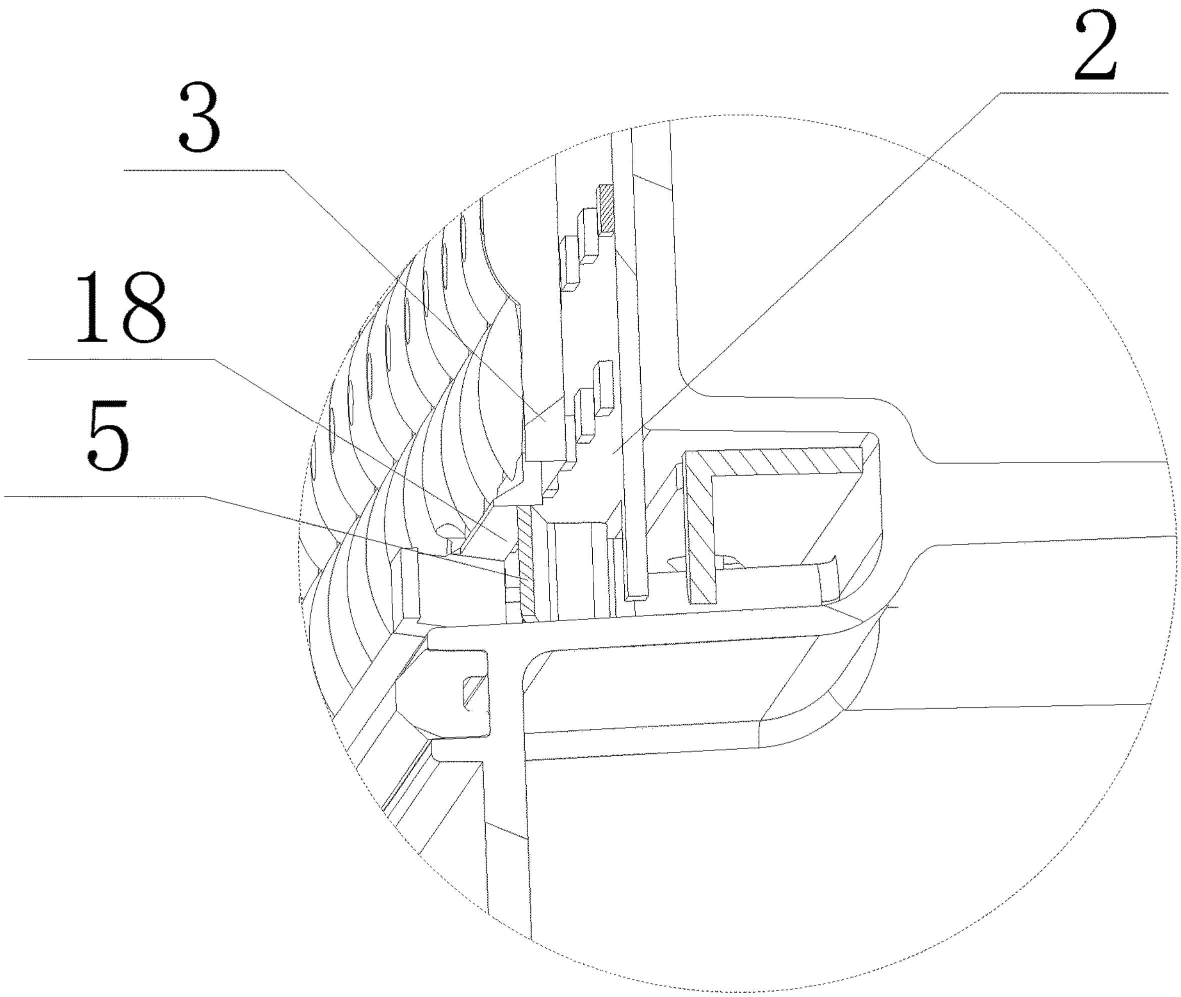
FIG. 11 is an enlarged view of position B of FIG. 10.

Referring to FIGS. 1 to 11, an LED lamp includes a lamp body 1, an LED lamp panel 2, a lens panel 3, and a quick disassembling structure. A front side of the lamp body 1 is provided with a mounting groove 4. The LED lamp panel 2 mounted in the mounting groove 4. The lens panel 3 covers the LED lamp panel 2. The quick disassembling structure is fixed to the lamp body 1 and configured to detachably connect lens panel 3 to the lamp body 1. the lens panel 3 is fixed on the lamp body 1 by the quick disassembling structure. In this way, the lens panel 3 can be replaced quickly.

The quick disassembling structure can be an elastic sheet 5. One end of the elastic sheet 5 is fixed in the mounting groove 4 of the lamp body 1 by a screw. The lens panel 3 is provided with a through hole 18 corresponding to the elastic sheet 5. The other end of the elastic sheet 5 extends outward transversely and away from the LED lamp panel 2 through the through hole 18, and an upper surface of the elastic sheet 5 facing the lens panel 3 partially abuts against the lens panel 3, so as to position the lens panel 3 in the lamp body 1.

An outer surface 19 of the end of the elastic sheet 5 extending outward away from the LED lamp panel 2 is coplanar with the lens panel 3 or located on a side of the lens panel 3 away from the LED lamp panel 2. The outer surface 19 of the elastic sheet 5 is pressed toward the LED lamp panel 2, so that the end of the elastic sheet 5 extending outward away from the LED lamp panel 2 moves toward the LED lamp panel 2 until the elastic sheet 5 extends through the through hole 18 toward the LED lamp panel 2 to disengage the lens panel 3 from the abutment of the elastic sheet 5, and then the lens panel 3 can be removed from the lamp body 1.

Conversely, when the lens panel 3 needs to be mounted, the lens panel 3 is placed on a front side of the LED lamp panel 2, and then lens panel 3 is manually supported upward. The elastic sheet 5 extends through the through hole 18, and the upper surface of the end of the elastic sheet 5 extending outward away from the LED lamp panel 2 abuts against the lens panel 3, so that the lens panel 3 is positioned in the lamp body 1.

An edge of the lens panel 3 is provided with an upward protruding step 6, and the step 6 is operated to remove the lens panel 3 after the elastic sheet 5 is pressed which is more convenient and quicker.

The LED lamp further includes a rotating assembly 7 and a moving member 8 both mounted to the lamp body 1. The rotating assembly 7 is movably connected to the moving member 8. The lens panel 3 is provided with a connecting portion 9 movably connected to the moving member 8. The moving member 8 is driven to move by rotating the rotating assembly 7, and the moving member 8 drives the lens panel 3 to move through the connecting portion 9, so that a distance between the lens panel 3 and the LED lamp panel 2 is changed, thereby adjusting the light distribution direction.

The rotating assembly 7 includes a rotating shaft 10 and a gear 11 sleeved on the rotating shaft 10. The moving member 8 is provided with a plurality of tooth holes cooperating with teeth of the gear 11, and the rotating assembly 7 drives the moving member 8 to move through the cooperation of the tooth and the tooth holes.

The moving member 8 is provided with an inclined elongated hole or arc-shaped elongated hole. The connecting portion 9 is located at the edge of the lens panel 3 and extends into the inclined elongated hole or arc-shaped elongated hole. The connecting portion 9 can be a connecting post. When the moving member 8 is moved, an edge of the inclined or arc-shaped elongated hole will press the connecting portion 9, so that a position of the connecting portion 9 is changed, and a relative position of the lens panel 3 and the LED lamp panel 2 is changed.

The LED lamp further includes a pressing frame 12, a glass plate 13, and a first sealing ring provided between the glass plate 13 and the pressing frame 12. The first sealing ring is further received in the mounting groove 4, so that the LED lamp panel 2 can achieve a good waterproof effect.

The glass plate 13 is located on a side of the lens panel 3 away from the LED lamp panel 2 and covers the mounting groove 4. One end of the pressing frame 12 is buckled with the lamp body 1, and the other end of the pressing frame 12 is fixed to the lamp body 1 by a screw.

The LED lamp further includes a power supply assembly mounted on a rear side of the lamp body 1. The power supply assembly includes a power supply box 14, a driving power source 15, and a controller 16 mounted in the power supply box 14. The power supply assembly further includes a mounting bracket 17 connected to the power supply box 14 or the lamp body 1. In this way, the heat generated by the driving power source 15 can be separated from the heat generated by the LED lamp panel 2 without affecting each other, so as to improve a service life of the driving power source 15 and the LED lamp panel 2.

The LED lamp further includes a second sealing ring provided between the power supply box 14 and the lamp body 1, and the second sealing ring is connected to the power supply box 14, so that the power supply box 14 can achieve a good waterproof effect.

According to the LED lamp, the lens panel 3 can be disassembled or assembled without additional tools, which is more convenient and quicker.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp comprising:

a lamp body, a front surface of the lamp body being provided with a mounting groove;

an LED lamp panel mounted in the mounting groove;

a lens panel covering the LED lamp panel; and a quick disassembling structure fixed to the lamp body and configured to detachably connect the lens panel to the lamp body;

wherein the quick disassembling structure is an elastic sheet, the lens panel is provided with a through hole corresponding to the elastic sheet, an end of the elastic sheet is fixed to the lamp body, another end of the elastic sheet extends outward transversely and away from the LED lamp panel through the through hole, an upper surface of the elastic sheet facing the lens panel partially abuts against the lens panel, and an outer surface of the end of the elastic sheet extending outward away from the LED lamp panel is coplanar with the lens panel or located on a side of the lens panel away from the LED lamp panel.

2. The LED lamp according to claim 1, wherein an edge of the lens panel is provided with an upward protruding step.

3. The LED lamp according to claim 2, further comprising a rotating assembly and a moving member both mounted to the lamp body, wherein the rotating assembly is movably connected to the moving member, and the lens panel is provided with a connecting portion movably connected to the moving member.

4. The LED lamp according to claim 3, wherein the rotating assembly comprises a rotating shaft and a gear sleeved on the rotating shaft, the moving member is provided with a plurality of tooth holes cooperating with teeth of the gear, and the rotating assembly drives the moving member to move through the cooperation of the teeth and the teeth holes.

5. The LED lamp according to claim 4, wherein the moving member is provided with an inclined or arc-shaped elongated hole, the connecting portion is located at the edge of the lens panel and extends into the inclined or arc-shaped elongated hole.

6. The LED lamp according to claim 5, further comprising a pressing frame, a glass plate, and a first sealing ring provided between the glass plate and the pressing frame and received in the mounting groove.

7. The LED lamp according to claim 6, wherein the glass plate is located on a side of the lens panel away from the LED lamp panel and covers the mounting groove, an end of the pressing frame is buckled with the lamp body, and another end of the pressing frame is fixed to the lamp body.

8. The LED lamp according to claim 7, further comprising a power supply assembly mounted on a rear side of the lamp body, wherein the power supply assembly comprises a power supply box, a driving power source, and a controller mounted in the power supply box.

9. The LED lamp according to claim 8, wherein the power supply assembly further comprises a mounting bracket connected to the power supply box or the lamp body.

10. The LED lamp according to claim 9, further comprising a second sealing ring provided between the power supply box and the lamp body and connected to the power supply box.

* * * * *